United States Patent Office 3,426,137
Patented Feb. 4, 1969

3,426,137
HAIR GROWTH INHIBITING BY
AMINOBENZOPHENONES
Richard F. Philpitt, Somerset, N.J., and Eugene P. Rubacky, 7201 Clarendon Rd., Bethesda, Md. 20014; said Richard F. Philpitt assignor to Olin Mathieson Chemical Corporation, a corporation of Virginia
No Drawing. Filed Dec. 23, 1965, Ser. No. 516,128
U.S. Cl. 424—330        17 Claims
Int. Cl. A61k 27/00, 7/14, 7/00

ABSTRACT OF THE DISCLOSURE

This invention pertains to hair growth inhibiting compositions and processes for inhibiting the growth of hair with substituted benzophenones as 2-amino-5-chlorobenzophenone, 2-amino-5 - trifluoromethylbenzophenone, 2-amino-5-fluorobenzophenone, 2-amino - 5 - bromobenzophenone, 2-amino-5-cyanobenzophenone and 2-amino-5-trichloromethylbenzophenone.

---

This invention relates to novel hair growth inhibiting compositions and to a novel process for inhibiting the growth of hair.

Considerable effort has been directed to the control of hair growth on mammals to improve their appearance and for health reasons. Usually this control is obtained by cutting, shaving or the use of depilatory agents. Although each of these techniques has some effect upon removing the hair from the desired area, none of them have any significant effect upon inhibiting the normal growth of hair. Furthermore, these techniques for controlling hair growth are time consuming, expensive and usually require extensive cleansing of the mammal and the surrounding area before the hair is removed.

It is a primary object of this invention to overcome the disadvantages inherent in previously known techniques for controlling hair growth in mammals.

Another object of the invention is to provide a novel composition capable of inhibiting the normal growth rate of hair.

Still another object of the invention is to provide a novel process for inhibiting the normal growth of hair.

It is another object of the invention to provide novel deodorants capable of inhibiting the normal growth of hair.

It is another object of the invention to provide novel creams capable of inhibiting the normal growth of hair.

It is another object of the invention to provide novel lotions capable of inhibiting the normal growth of hair.

It is another object of the invention to provide novel dusting powders capable of inhibiting the normal growth of hair.

It is another object of the invention to provide novel depilatory creams containing a compound capable of inhibiting the normal growth of hair.

These and other objects of the invention will be apparent from the following detailed description.

It has now been discovered that the foregoing objects are accomplished when certain substituted benzophenones, which are defined in more detail below, are commingled with a suitable carrier, and the resulting mixture is applied to a depilated portion of mammal skin on which it is desired to inhibit the rate of growth of hair.

More in detail, the substituted benzophenones capable of inhibiting the rate of growth of hair are amino-substituted, halogeno-substituted benzophenones such as 2-amino-5-chlorobenzophenone, 2-amino-5-trifluoromethylbenzophenone, 2-amino-5-fluorobenzophenone, 2-amino-5-bromobenzophenone, 2-amino-5 - cyanobenzophenone, 2-amino-5-trichloromethylbenzophenone, mixtures thereof and the like.

Although the substituted benzophenones may be applied to the depilated section directly in undiluted, powdered form, it is preferred that the hair growth inhibiting composition be formulated in the usual topologically accepted carrier compositions such as deodorants, creams, lotions, dusting powders, depilatory creams, soaps, aerosols and gels. The concentration of the substituted benzophenones in the carrier composition is any amount capable of giving the desired control of hair growth, and is generally in the range between about 0.1 and about 10 percent by weight of the total weight of the formulation, and is preferably between about 1 and about 5 percent by weight of the total formulation. However, greater or lesser proportions may be employed, if desired.

The substituted benzophenones of this invention are incorporated in conventional deodorants and antiperspirants containing aluminum chlorhydroxide and stearic acid as predominant components, deodorant sticks containing sodium stearate and sorbitol in significant proportions, and spray deodorants containing aluminum phenolsulfonate are typical deodorant formulations in which the substituted benzophenones are effective. When deodorant compositions containing the substituted benzophenones of this invention are applied to the skin, which has been shaved or which has been freed of hair or depilated by other means, not only is the skin deodorized, but the rate of hair growth on the skin thus treated is inhibited significantly.

A similar effect is obtained when the substituted benzophenones are incorporated in cleansing creams, lotions, and dusting powders, and the resulting compositions are applied to the skin which has been freed of hair by shaving or otherwise.

The substituted benzophenones are especially useful when incorporated in depilatory creams, and the resulting mixture is applied to an area of skin containing hair. Suitable depilatory creams include those containing thioglycolates as the active ingredient as well as those containing metal sulfides as the active ingredient. The depilatory agent in the cream removes the hair from the skin that is treated, and the substituted benzophenones in the cream effectively inhibit the growth of hair from the depilated area of skin. Thus, even though the description and claims recite "applying to a depilated portion of skin," it will be recognized by those skilled in the art that this langauge also includes the procedure in which the substituted-benzophenones of this invention may be applied to skin which initially contains hair, and the hair is separated from the skin by a depilatory or other means while the substituted benzophenone is retained in contact with the depilated skin.

Detergent materials having an organic anionic surface active detergent base or an organic non-ionic surface base of the type described in U.S. Patent No. 2,846,398 issued to David J. Beaver et al. on Aug. 5, 1958, are suitable soap formulations in which the substituted benzophenone compounds of this invention can be incorporated.

In addition, incorporating the substituted benzophenones of this invention in shaving creams and after-shave lotions also result in an effective technique for inhibiting the growth of beards.

The following examples are presented in order to define the invention more fully without any intention of being limited thereby. All parts and percentages are by weight unless otherwise indicated.

Example 1.—Preparation of a lotion

To prepare a lotion containing the substituted benzophenones of this invention the following ingredients are compounded in the usual manner:

| | Grams |
|---|---|
| 2-amino-5-chlorobenzophenone | 1.0 |
| Propylene glycol | 7.5 |
| Titanium dioxide | 0.2 |
| Cetyl alcohol | 3.0 |
| Stearyl alcohol | 0.2 |
| Polyoxyalkylated sorbitan monolaurate [1] | 2.2 |
| Methylparahydroxybenzoate | 0.2 |
| Propylparahydroxybenzoate | 0.02 |
| Distilled water to make | 100.0 |

[1] Sold commercially by Atlas Powder Company under the trademark "Tween 20."

Example 2.—Preparation of a cream

To prepare a cream containing the substituted benzophenones of this invention the following ingredients are compounded in the usual manner:

| | Grams |
|---|---|
| 2-amino-5-chlorobenzophenone | 1.0 |
| Stearic acid | 10.0 |
| Beeswax | 1.5 |
| Glycerin | 5.0 |
| Casein | 0.3 |
| Ammonium hydroxide | 0.5 |
| Water to make | 100.0 |

Example 3.—Preparation of a cream deodorant

To prepare a cream deodorant containing the substituted benzophenones of this invention the following ingredients are compounded in the usual manner:

| | Grams |
|---|---|
| 2-amino-5-chlorobenzophenone | 1.0 |
| Aluminum chlorhydroxide | 20.0 |
| Sorbitan monostearate | 5.0 |
| Polyoxyethylene sorbitan monostearate | 5.0 |
| Stearic acid | 15.0 |
| Propylene glycol | 5.0 |
| Water | 50.0 |

Example 4.—Preparation of a stick deodorant

To prepare a stick deodorant containing the substituted benzophenones of this invention the following ingredients are compounded in the usual manner:

| | Grams |
|---|---|
| 2-amino-5-chlorobenzophenone | 1.0 |
| Sodium stearate | 8.0 |
| Sorbitol | 5.0 |
| Hexachlorophene | 0.2 |
| Alcohol | 80.0 |
| Water | 6.0 |

Example 5.—Preparation of a spray deodorant

To prepare a spray deodorant containing the substituted benzophenones of this invention the following ingredients are compounded in the usual manner:

| | Grams |
|---|---|
| 2-amino-5-chlorobenzophenone | 1.0 |
| Aluminum phenolsulfonate | 10.0 |
| Propylene glycol | 5.0 |
| Alcohol | 85.0 |
| Perfume | Trace |

Example 6.—Preparation of a depilatory

To prepare a depilatory containing the substituted benzophenones of this invention the following ingredients are compounded in the usual manner:

| | Grams |
|---|---|
| 2-amino-5-chlorobenzophenone | 1.0 |
| Calcium thioglycolate | 7.5 |
| Calcium carbonate | 20.0 |
| Calcium hydroxide | 1.5 |
| Cetyl alcohol | 6.0 |
| Sodium lauryl sulfate | 0.5 |
| Water | 65.5 |

Example 7.—Preparation of a face powder

To prepare a face powder containing the substituted benzophenones of this invention the following ingredients are compounded in the usual manner:

| | Grams |
|---|---|
| 2-amino-5-chlorobenzophenone | 1.0 |
| Talc | 50.0 |
| Kaolin | 15.0 |
| Zinc oxide | 15.0 |
| Calcium carbonate | 10.0 |
| Magnesium carbonate | 5.0 |
| Zinc stearate | 5.0 |

Example 8.—Preparation of a shaving cream (brushless type)

To prepare a shaving cream (brushless type) containing the substituted benzophenones of this invention the following ingredients are compounded in the usual manner:

| | Grams |
|---|---|
| 2-amino-5-chlorobenzophenone | 1.0 |
| Stearic acid | 25.0 |
| Mineral oil | 10.0 |
| Triethanolamine | 0.5 |
| Borax | 0.5 |
| Water | 64.0 |
| Perfume | Trace |

Example 9.—Preparation of a shaving cream (lather type)

To prepare a shaving cream (lather type) containing the substituted benzophenones of this invention the following ingredients are compounded in the usual manner:

| | Grams |
|---|---|
| 2-amino-5-chlorobenzophenone | 1.0 |
| Sodium and potassium stearine soap | 30.0 |
| Sodium and potassium coconut oil soap | 15.0 |
| Glycerol | 10.0 |
| Water | 45.0 |
| Perfume | Trace |

Example 10.—Preparation of an aftershave lotion

To prepare an aftershave lotion containing the substituted benzophenones of this invention the following ingredients are compounded in the usual manner:

| | Grams |
|---|---|
| 2-amino-5-chlorobenzophenone | 1.0 |
| Menthol | 0.1 |
| Camphor | 0.1 |
| Sorbitol | 2.0 |
| Hexachlorophene | 0.1 |
| Perfume oil | 1.0 |
| Alcohol | 50.0 |
| Water | 46.7 |

Example 11

The back area of four rabbits (each area being equivalent to about 225 square centimeters) were shaven. Approximately two grams of powdered 2-amino-5-chlorobenzophenone was rubbed on the shaven area of each rabbit. After 55 days of exposure to these conditions, all of the rabbits were free from any signs of irritation in the shaven area. In addition, after 55 days, about 90 percent of the shaven area was without hair. About 10 percent of the shaven area had slight hair growth which varied from 0.1 centimeter to 2 centimeters at the end of this period.

For purposes of comparison, four rabbits were treated in the same manner with the exception that no 2-amino-5-chlorobenzophenone was applied to the shaven area. At the end of the same period, hair had grown about 4 centimeters over the entire area that had been previously shaven. This comparison clearly shows the superior hair-growth inhibiting properties of 2-amino-5-chlorobenzophenone.

Example 12

The left arm of one man (equivalent to about 40 square centimeters) was shaven. About 0.25 gram of powdered 2-amino-5-chlorobenzophenone was rubbed on the shaven area and retained there for about 24 hours, after which it washed off with water. After 55 days of exposure to these conditions, the arm was free from any signs of irritation in the shaven area. In addition, only slight hair growth occurred which varied from 0.1 centimeter to 0.5 centimeter.

Various modifications of the invention, some of which have been referred to above, may be employed without departing from the spirit of the invention.

What is desired to be secured by Letters Patent is:

1. A hair growth inhibiting cream containing a hair growth inhibiting proportion of a compound selected from the group consisting of 2-amino-5-chlorobenzophenone, 2-amino-5-trifluoromethylbenzophenone, 2-amino-5-fluorobenzophenone, 2-amino-5-bromobenzophenone, 2-amino-5-cyanobenzophenone and 2-amino-5-trichlorobenzophenone.

2. A hair growth inhibiting face powder containing a hair growth inhibiting growth proportion of a compound selected from the group consisting of 2-amino-5-chlorobenzophenone, 2-amino-5-trifluorobenzophenone, 2-amino - 5 - fluorobenzophenone, 2-amino-5-bromobenzophenone, 2-amino-5-cyanobenzophenone and 2-amino-5-trichloromethylbenzophenone.

3. A body cream containing a hair growth inhibiting proportion of 2-amino-5-chlorobenzophenone.

4. A deodorant containing a hair growth inhibiting proportion of 2-amino-5-chlorobenzophenone.

5. A depilatory cream containing a hair growth inhibiting proportion of 2-amino-5-chlorobenzophenone.

6. A shaving cream containing a hair growth inhibiting proportion of 2-amino-5-chlorobenzophenone.

7. An aftershave lotion containing a hair growth inhibiting proportion of 2-amino-5-chlorobenzophenone.

8. A soap containing a hair growth inhibiting proportion of 2-amino-5-chlorobenzophenone.

9. The process for inhibiting hair growth which comprises applying to a depilated portion of skin a hair growth inhibiting proportion of a compound selected from the group consisting of 2-amino-5-chlorobenzophenone, 2-amino-5-trifluoromethylbenzophenone, 2-amino-5-fluorobenzophenone, 2-amino-5-bromobenzophenone, 2-amino-5 - cyanobenzophenone and 2-amino-5-trichloromethylbenzophenone.

10. The process of claim 9 wherein said compound is 2-amino-5-chlorobenzophenone.

11. The process of claim 9 wherein said compound is commingled with a carrier.

12. The process of claim 11 wherein the proportion of said compound is in the range between about 0.1 and about 10 percent by weight of the total weight of said compound and said carrier.

13. The process for inhibiting the growth of hair which comprises applying to a depilated portion of skin a hair inhibiting portion of 2-amino-5-chlorobenzophenone commingled with a carrier.

14. The process of claim 13 wherein the proportion of said 2-amino-5-chlorobenzophenone is in the range between about 0.1 and about 10 percent by weight of the total weight of said benzophenone and said carrier.

15. The process of claim 14 wherein said carrier is a depilatory cream.

16. The process of claim 14 wherein said carrier is a shaving cream.

17. The process of claim 14 wherein said carrier is an aftershave lotion.

References Cited

UNITED STATES PATENTS

| 2,678,901 | 5/1954 | Fox et al. | 167—87 |
| 3,068,151 | 12/1962 | Haefele | 167—87.1 |
| 3,123,529 | 3/1964 | Kariss et al. | 167—58 |
| 3,203,990 | 8/1965 | Keller et al. | 260—570 |

FOREIGN PATENTS 951,301  3/1964  Great Britain.

ALBERT T. MEYERS, *Primary Examiner.*

V. C. CLARKE, *Assistant Examiner.*

U.S. Cl. X.R.

252—117; 424—65, 68, 69, 73, 304